(12) United States Patent
Shmilovici

(10) Patent No.: US 11,271,857 B2
(45) Date of Patent: Mar. 8, 2022

(54) DYNAMIC ALLOCATION OF MEMORY FOR PACKET PROCESSING INSTRUCTION TABLES IN A NETWORK DEVICE

(71) Applicant: Marvell Israel (M.I.S.L) Ltd., Yokne'am (IL)

(72) Inventor: Zvi Leib Shmilovici, Tel Aviv (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 111 days.

(21) Appl. No.: 15/929,868

(22) Filed: May 27, 2020

(65) Prior Publication Data
US 2020/0287832 A1 Sep. 10, 2020

Related U.S. Application Data

(63) Continuation of application No. 16/254,732, filed on Jan. 23, 2019, now Pat. No. 10,700,974.

(60) Provisional application No. 62/623,957, filed on Jan. 30, 2018.

(51) Int. Cl.
| | | |
|---|---|---|
| *H04L 12/26* | (2006.01) | |
| *H04L 45/745* | (2022.01) | |
| *G06F 12/06* | (2006.01) | |
| *H04L 45/748* | (2022.01) | |
| *H04L 45/7453* | (2022.01) | |

(52) U.S. Cl.
CPC ...... *H04L 45/7457* (2013.01); *G06F 12/0646* (2013.01); *H04L 45/748* (2013.01); *H04L 45/7453* (2013.01); *G06F 2212/154* (2013.01)

(58) Field of Classification Search
None
See application file for complete search history.

(56) References Cited

U.S. PATENT DOCUMENTS

| | | |
|---|---|---|
| RE38,821 E | 10/2005 | Shemla et al. |
| 7,571,156 B1 | 8/2009 | Gupta et al. |
| 7,852,850 B2 | 12/2010 | Kopelman et al. |
| 8,577,854 B1 | 11/2013 | Kopelman et al. |
| 9,171,030 B1 | 10/2015 | Arad et al. |
| 9,537,771 B2 | 1/2017 | Arad et al. |
| 9,906,443 B1 | 2/2018 | Singh et al. |
| 10,587,516 B1 | 3/2020 | Arad et al. |

(Continued)

*Primary Examiner* — Zewdu A Beyen

(57) ABSTRACT

A method for operating a network device, having data storage with selectably modifiable capacity for storing instructional data for a packet processing operation, includes detecting a need for additional storage for the instructional data, allocating an additional memory block without interrupting operation of the network device, associating with the additional memory block an additional address hashing function, different from each of at least one respective previous address hashing function associated with any previously-allocated memory block. Each respective previous address hashing function transforms a look-up key into a respective addressable location in a previously-allocated memory block, and the additional address hashing function transforms the look-up key into an addressable location in the additional memory block. When a block is deallocated, each unit of instructional data is reprocessed through the hashing function of a different block to which the unit of the instructional data will be moved.

20 Claims, 8 Drawing Sheets

(56) References Cited

U.S. PATENT DOCUMENTS

| | | |
|---|---|---|
| 2008/0080539 A1* | 4/2008 | Hong ............... H04L 49/90 |
| | | 370/402 |
| 2008/0275872 A1 | 11/2008 | Venkatachary et al. |
| 2013/0239193 A1 | 9/2013 | Bouchard et al. |
| 2014/0064091 A1 | 3/2014 | Basso et al. |
| 2014/0244779 A1* | 8/2014 | Roitshtein ............ H04L 45/748 |
| | | 709/213 |
| 2014/0301394 A1* | 10/2014 | Arad ............... G06F 16/214 |
| | | 370/392 |
| 2016/0285753 A1 | 9/2016 | Guleria et al. |
| 2017/0068700 A1 | 3/2017 | Sapa et al. |
| 2017/0366502 A1 | 12/2017 | Kravchik et al. |
| 2017/0371806 A1* | 12/2017 | Ritchie ............... G06F 13/1663 |

\* cited by examiner

DYNAMIC ALLOCATION OF MEMORY FOR PACKET PROCESSING INSTRUCTION TABLES IN A NETWORK DEVICE

CROSS REFERENCE TO RELATED APPLICATION

This is a continuation of copending, commonly-assigned U.S. patent application Ser. No. 16/254,732, filed Jan. 23, 2019, now U.S. Pat. No. 10,700,974, which claims the benefit of, commonly-assigned U.S. Provisional Patent Application No. 62/623,957, filed Jan. 30, 2018, each of which is hereby incorporated by reference herein in its respective entirety.

FIELD OF USE

This disclosure relates to the allocation of memory for storing packet processing instruction tables in a network data device. More particularly, this disclosure relates to dynamic allocation and de-allocation of memory for the packet processing instruction tables of a network data device, to accommodate changing capacity needs of the packet processing instruction tables during network device operation.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Network data devices, such as switching devices, use packet processing instruction tables (e.g., forwarding tables) to define the different types of actions that may need to be performed on network packets processed through the device. In previously-known network devices, the packet processing instruction tables are configured when the network device is started, based on "profiles" that define the actions that may be required. Different packet processing instruction tables according to different profiles consume different amounts of memory, and the necessary memory is allocated when the network device is started. In some previously-known network devices, if, during operation, one or more profiles had to be changed, or one or more new profiles had to be added, the network device had to be stopped, and then restarted with a new set of profiles, causing network performance degradation.

SUMMARY

In accordance with implementations of the subject matter of this disclosure, a method for operating a network device, having a data storage resource with selectably modifiable capacity for storing instructional data to be employed in a packet processing operation, includes detecting a need for additional storage resources to store the instructional data to be employed in a packet processing operation, allocating an additional memory block, to store the instructional data to be employed in the packet processing operation, without interrupting operation of the network device, associating with the additional memory block an additional address hashing function, different from each of at least one respective previous address hashing function associated with a respective one of at least one previously-allocated memory block, each respective previous address hashing function transforming a look-up key into a respective addressable location in a respective one of the at least one previously-allocated memory block, and the additional address hashing function transforming the look-up key into an addressable location in the additional memory block, processing a unit of the instructional data to be employed in the packet processing operation through the additional address hashing function to determine a location, in the additional memory block, for storing the unit of the instructional data to be employed in the packet processing operation, storing the unit of the instructional data to be employed in the packet processing operation at the location determined by the additional address hashing function, receiving an incoming network packet from a network and generating an incoming look-up key for the incoming network packet based at least on data extracted from a header of the incoming network packet, processing the incoming look-up key through each of the at least one respective previous address hashing function to generate respective hash results, and through the additional address hashing function to generate an additional hash result, and accessing each respective previously allocated memory block according to a respective memory address associated with one of the respective hash results and accessing the additional memory block according to an additional memory address associated with the additional hash result to retrieve instructional data including an instruction to perform an action on the received packet.

In a first implementation of such a method, the detecting the need for additional storage resources to store the instructional data to be employed in the packet processing operation may include attempting to store the instructional data to be employed in the packet processing operation, and finding only occupied memory locations during the attempting.

In a second implementation of such a method, the instructional data to be employed in the packet processing operation may associate an action to be performed on an incoming network packet with an attribute of the network packet. In a first variant of that second implementation, the instructional data to be employed in the packet processing operation may associate an action to be performed on an incoming network packet with header data of the incoming network packet. In a second variant of that second implementation, the instructional data to be employed in the packet processing operation associates an action to be performed on an incoming network packet with a physical attribute of the incoming network packet. In a third variant of that second implementation, the instructional data to be employed in the packet processing operation may associate an action to be performed on an incoming network packet with a port at which the incoming network packet is received.

In a third implementation of such a method, the accessing each respective previously allocated memory block according to a respective memory address associated with one of the respective hash results, and the accessing the additional memory block according to an additional memory address associated with the additional hash result, are performed in parallel, together returning a plurality of candidate units of instructional data, and the method further includes selecting one of the candidate units of instructional data.

In a variant of that third implementation, each unit of the data for the type of packet processing operation stored at a location in one of the additional memory block and the at least one previously-allocated memory block may be stored along with a raw look-up key that was hashed to determine the location to store the unit of the data for the type of packet processing operation, and the selecting may include comparing the raw look-up key to the incoming look-up key.

A fourth implementation of such a method further includes determining that any one of the previously allocated memory blocks and the additional memory block is an excess memory block that is not required for operation of the network device, and deallocating the excess memory block without interrupting operation of the network device, by rehashing stored data in the excess memory block according to a hash function of a respective remaining memory block, and storing the rehashed stored data at an address in the respective remaining memory block according to the rehash.

In a first variant of such a fourth implementation, the deallocating further includes maintaining the excess memory block in operation until all stored data in the excess memory block has been moved to the respective remaining memory block. Such a variant further includes, during the maintaining, when accessing each respective previously allocated memory block according to a respective memory address associated with one of the respective hash results and accessing the additional memory block according to an additional memory address associated with the additional hash result results in retrieving a first instance of instructional data from the excess memory block and a second instance of instructional data from the respective remaining memory block, selecting one of the first instance of instructional data and the second instance of instructional data.

Such a fourth implementation may further include monitoring capacity of the previously allocated memory blocks and the additional memory block, wherein the determining includes detecting that the capacity of the previously allocated memory blocks and the additional memory block has fallen below a predetermined threshold.

In such a fourth implementation, the determining may comprise detecting entrance into a scheduled time-of-day period during which network traffic is reduced.

In accordance with implementations of the subject matter of this disclosure, a network device includes a plurality of ports, at least one receive buffer coupled to the plurality of ports, at least one transmit buffer coupled to the plurality of ports, a selectably modifiable quantity of memory blocks for storing packet processing data characterizing a packet processing operation to be performed on a network packet received at, or to be transmitted from, one of the plurality of ports, and a controller for operating the network device, including selectably modifying the quantity of memory blocks for storing the packet processing data, the controller being configured to detect a need for additional storage resources to store instructional data to be employed in a packet processing operation allocate an additional memory block, to store the instructional data to be employed in the packet processing operation, without interrupting operation of the network device, to associate with the additional memory block an additional address hashing function, different from each of at least one respective previous address hashing function associated with a respective one of at least one previously-allocated memory block, each respective previous address hashing function transforming a look-up key into a respective addressable location in a respective one of the at least one previously-allocated memory block, and the additional address hashing function transforming the look-up key into an addressable location in the additional memory block, process a unit of the instructional data to be employed in the packet processing operation through the additional address hashing function to determine a location, in the additional memory block, for storing the unit of the instructional data to be employed in the packet processing operation, store the unit of the instructional data to be employed in the packet processing operation at the location determined by the additional address hashing function, receive an incoming network packet from a network and generate an incoming look-up key for the incoming network packet based at least on data extracted from a header of the incoming network packet, process the incoming look-up key through each of the at least one respective previous address hashing function to generate respective hash results, and through the additional address hashing function to generate an additional hash result, and access each respective previously allocated memory block according to a respective memory address associated with one of the respective hash results and access the additional memory block according to an additional memory address associated with the additional hash result to retrieve instructional data including an instruction to perform an action on the received packet.

In a first implementation of such a network device, the controller may be configured to access each respective previously allocated memory block according to a respective memory address associated with one of the respective hash results, and to access the additional memory block according to an additional memory address associated with the additional hash result, in parallel, to return a plurality of candidate units of instructional data, and to select one of the candidate units of instructional data.

In such an implementation, each unit of the data for the type of packet processing operation stored at a location in one of the additional memory block and the at least one previously-allocated memory block is stored along with a raw look-up key that was hashed to determine the location to store the unit of the data for the type of packet processing operation, and the controller is configured to select one of the candidate units of instructional data by comparing the raw look-up key to the incoming look-up key.

In a second implementation of the subject matter of this disclosure, the controller may further be configured to determine that any one of the previously allocated memory blocks and the additional memory block is an excess memory block that is not required for operation of the network device, and to deallocate the excess memory block without interrupting operation of the network device, by rehashing stored data in the excess memory block according to a hash function of a respective remaining memory block, and storing the rehashed stored data at an address in the respective remaining memory block according to the rehash.

In a first variant of that second implementation, the controller may further be configured to maintain the excess memory block in operation until all stored data in the excess memory block has been moved to the respective remaining memory block. In such a variant, the controller may further be configured to, during the maintaining, when accessing each respective previously allocated memory block according to a respective memory address associated with one of the respective hash results and accessing the additional memory block according to an additional memory address associated with the additional hash result results in retrieving a first instance of instructional data from the excess memory block and a second instance of instructional data from the respective remaining memory block, select one of the first instance of instructional data and the second instance of instructional data.

In a second variant of that second implementation, the controller may further be configured to monitor capacity of the previously allocated memory blocks and the additional memory block, and determine that any one of the previously allocated memory blocks and the additional memory block is an excess memory block that is not required for operation of the network device by detecting that the capacity of the previously allocated memory blocks and the additional memory block has fallen below a predetermined threshold.

In a third variant of that second implementation, the controller may further be configured to determine that any one of the previously allocated memory blocks and the additional memory block is an excess memory block that is not required for operation of the network device by detecting entrance into a scheduled time-of-day period during which network traffic is reduced.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
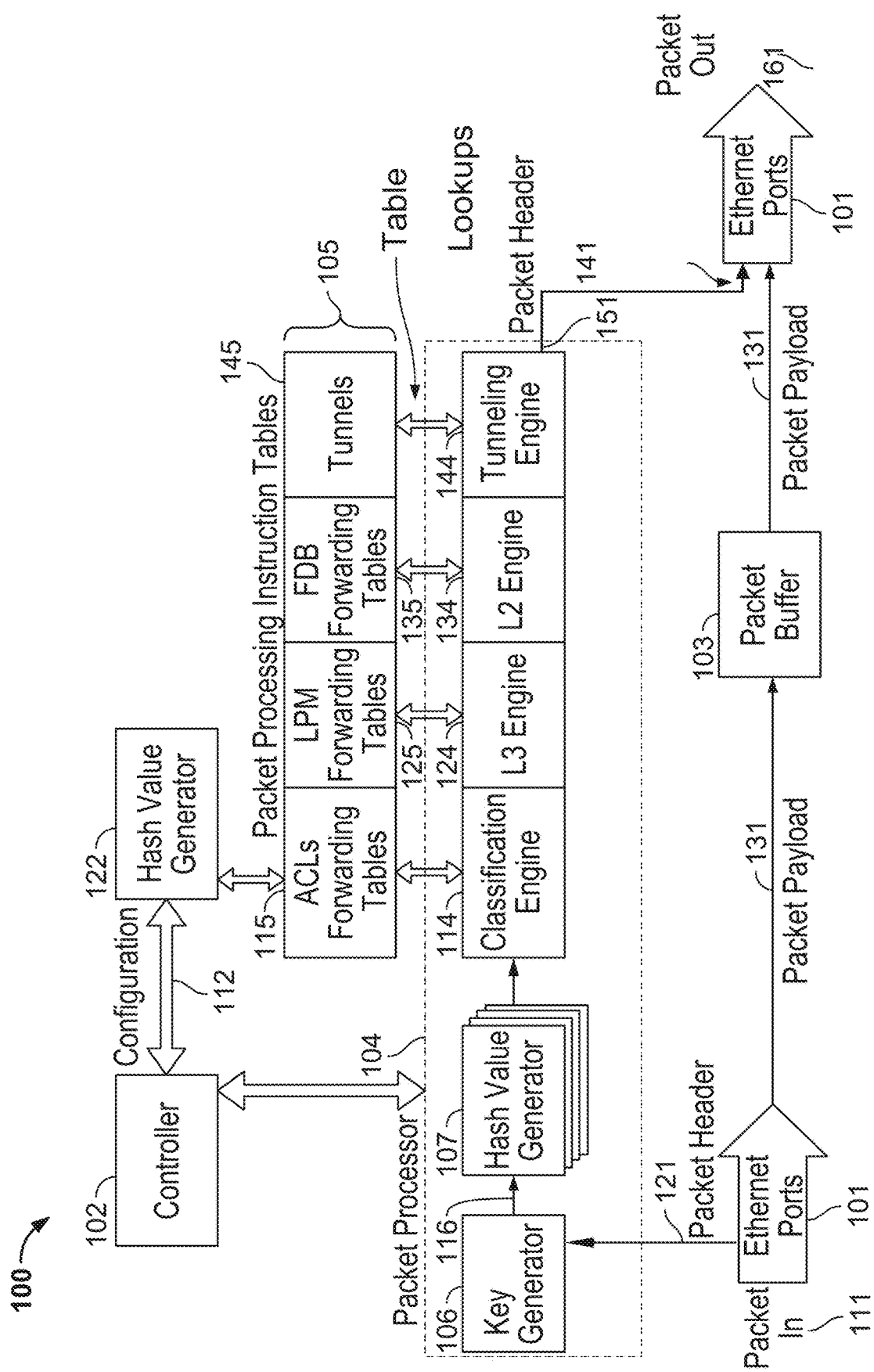
FIG. 1 is a high-level diagram of the relevant portions of a network device incorporating implementations of the subject matter of the present disclosure.

As noted above, network data devices, such as switching devices, use packet processing instruction tables (e.g., forwarding tables) to define the different types of actions that may need to be performed on network packets processed through the device. The actions may include such things as forwarding the network packet to a port, dropping the network packet, assigning quality of service, etc. The actions may be determined based on attributes of any particular packet. The attributes may include header information, including source and destination addresses that may affect how a network packet is handled, as well as physical attributes of the network packet, such as the port on the device at which the network packet was received. In some implementations, a memory is shared for storing data of two or more different processing instruction tables, and a certain amount of memory space in the shared memory is allocated for storing each of the respective packet processing instruction tables. It may happen that through normal operation of the network data device, the amount of memory needed for the packet processing instruction tables may change—i.e., the amount of memory needed for the packet processing instruction tables may increase or decrease.

Allocating and deallocating memory blocks or banks for the packet processing instruction tables of a network device is complicated by the addressing needs associated with accessing packet processing instructions in the tables. When an instruction is to be written into the packet processing instruction tables, characteristics of the instruction (including, e.g., contents of the packet header, as well as packet metadata such as source port, time, size, etc.) are used to generate a look-up key. A separate hash function is associated with each memory block or bank that is allocated to the packet processing instruction tables. The look-up key is processed through the respective hash functions of each memory block or bank in the packet processing instruction tables that is allocated to the type of instruction that is being written, generating, for each memory block or bank, an address where the instruction might be stored.

In some implementations, all of the resulting possible locations are examined. Any location that is occupied is skipped. If there is no unoccupied location, it would be necessary to allocate one or more additional memory blocks or banks, as described below in connection with implementations of the subject matter of the present disclosure.

Assuming that there is at least one unoccupied location, the instruction is written to that location. If there is only one unoccupied location, the decision is easy. If there is more than one unoccupied location, then in some implementations the instruction may be stored in the first unoccupied location that is found. Alternatively, in some implementations the unoccupied location in the memory block or bank with the highest existing occupancy may be used, as described, e.g., in U.S. Pat. No. 9,171,030, which is hereby incorporated by reference in its entirety (to facilitate potential deallocation of other memory blocks or banks as described below in connection with implementations of the subject matter of the present disclosure). Other criteria also may be used to select from among multiple unoccupied locations. Wherever the packet processing instruction is stored, a copy of the raw look-up key that was hashed to generate the address where the instruction is stored is included with the instruction.

In some other implementations, a "cuckoo hashing" algorithm, such as that described in above-incorporated U.S. Pat. No. 9,171,030, may be employed. In such an implementation, if a target hash collides with a previous value occupying the location, the previous value occupying that location is moved elsewhere, when possible, and the current value is inserted at the location that is vacated by the move operation.

In either type of implementation, if there is no unoccupied location, it would be necessary to allocate one or more additional memory blocks or banks, as described below in connection with implementations of the subject matter of the present disclosure.

When a network data packet is received for processing, the network data device generates a look-up key based on one or more of data in a packet header (or packet descriptor), network data (such as an ingress port), and metadata for the packet. The look-up key is used to search for an appropriate packet processing instruction in the packet processing instruction tables. The look-up key is run through the separate hash function associated with each memory block or bank that is allocated to the packet processing instruction tables, resulting in multiple potential addresses where the relevant packet processing instruction may be located. Each location is examined. If a location is empty, that location is ignored. The nature of the hash function may be that more than one look-up key can return a particular address. Therefore, for each location that is not empty, the raw look-up key stored in that location is compared to the look-up key that was hashed and, if there is a match, the corresponding instruction is used. In some implementations (such as are described below), there may be more than one location containing the correct instruction. As the instructions in such locations will be identical, any copy can be used.

In accordance with implementations of the subject matter of the present disclosure, one or more additional memory blocks or banks may be allocated to the packet processing instruction tables of a network data device when additional capacity is needed for packet processing instruction storage. In addition, in at least some implementations, memory blocks or banks also may be deallocated from the packet processing instruction tables of a network data device when there is excess capacity. When an excess memory block or bank is deallocated, it can, for example, be shut down completely reduce power consumption by the network data device. Alternatively, an excess memory block or bank may be deallocated from one or more, but fewer than all, packet processing instruction tables, while remaining allocated to one or more other packet processing instruction tables, particularly when there are different types of packet processing instruction tables and it is desired to maintain the different types of packet processing instruction tables in respective different memory blocks or banks. In any of those implementations, the allocation and deallocation of memory blocks or banks occurs during operation, without having to shut down the network data device to load new profiles.

According to implementations of the subject matter of the present disclosure, an additional memory block or bank is allocated to the packet processing instruction tables when space cannot be found for a new packet processing instruction. An existing unused memory block or bank is designated for this purpose, and a new hash function, different from the hash functions of all other memory blocks or banks already in use, is associated with the newly-allocated memory block or bank. The look-up key of the packet processing instruction that triggered the allocation of the memory block or bank is processed through the new hash function and stored with its raw look-up key in a location in the new memory block or bank as indicated by the new hash function. The new memory block or bank, and its hash function, are included in the key-hashing process when any subsequent new packet processing instruction is added to the packet processing instruction tables.

According to implementations of the subject matter of the present disclosure, a memory block or bank also may be deallocated from the packet processing instruction tables, for several possible reasons. For example, the network data device may be located in a data center, and in order to reduce power consumption, the data center operator may prefer to consolidate the memory block or banks used for the packet processing instruction tables at certain times of day when data traffic is reduced, such as at night. Such consolidation would be subject to capacity constraints in any case—i.e., the packet processing instruction tables cannot be consolidated into fewer memory block or banks than can contain all of the packet processing instructions. So even at a time of day when consolidation is preferred, the occupancy of the allocated memory block or banks would be compared to the total capacity, and deallocation would be performed if the free space in the packet processing instruction tables exceeded at least the size of one memory block or bank. In other implementations, deallocation may be performed whenever the free space in the packet processing instruction tables exceeds at least the size of one memory block or bank, regardless of the time of day. Deallocation normally would not be performed if the total occupancy of the packet processing instruction tables after deallocation would exceed some predetermined threshold, because space would have to remain available for new packet processing instructions to be added in the course of normal operations.

When it is determined that deallocation should be performed, it is unlikely that a completely empty memory block or bank will exist that can simply be deactivated. More likely, in implementations of the subject matter of the present disclosure, packet processing instructions will be moved from the least occupied memory block or blocks to empty space in other memory blocks or banks. In order to keep the network data device in operation, packet processing instructions to be moved will be kept in their original locations until they can be copied to new locations. The process of copying and moving the packet processing instructions may take multiple clock cycles. During that time, some packet processing instructions will have already been copied—and therefore may be found in more than location—while others remain to be copied. As noted above, it will not matter which copy of any such instruction is used to process a packet to which the instruction applies. Only after all packet processing instructions in a block or bank to be deallocated (which may be referred to as an "excess block") have been copied to new locations, so that the block or bank has been emptied, will that block or bank be deallocated. The deallocated block or bank can be deactivated, or reallocated to a different type of packet processing instruction table that is stored in the shared memory.

According to some implementations, the copying process includes, for each instruction to be moved, re-hashing the instruction according to the hash function associated with the remaining block or bank to which the instruction is to be moved (the "destination block"), and then storing the re-hashed instruction at an address in the destination block at an address indicated by the re-hashing.

After a memory block or bank has been deallocated from the packet processing instruction tables, the look-up keys of subsequent packets will be hashed only against the remaining blocks or banks allocated to the packet processing instruction tables.

A high-level diagram of the relevant portions of a network device 100 incorporating implementations of the subject matter of the present disclosure is shown in FIG. 1. Network device 100 has Ethernet ports 101 where packets enter from, and exit to, a computer network (not shown). Although for ease of representation separate ports are shown for packet ingress and egress, Ethernet ports 101 generally are bidirectional, and the same Ethernet ports 101 may be used for both packet ingress and packet egress.

Under direction of controller 102, a received packet 111 is split into its packet header 121 and its packet payload 131. The packet payload 131 is stored in a packet buffer 103 while packet header 121, or a descriptor generated in part from data that is extracted from the packet header 121, is processed through a packet processor 104 to determine various packet processing operations to be performed on packet 111, including, e.g., to determine a port to which packet 111 is to be forwarded. After processing, the descriptor is used to alter the header, which is retrieved from memory, and the modified packet header 151 is reunited with packet payload 131 at 141 to reconstruct packet 161, which is transmitted from Ethernet ports 101 onto the network for routing to the proper destination.

As mentioned above, in some implementations, different types of instruction tables are stored in the shared memory. Use of a shared memory space facilitates flexibility in resizing the different tables based on relative size needs for the different tables, which are not static over time. This would not be possible if each table were stored in a dedicated device, or if the partitioning of the shared memory were fixed. In the implementation shown, different components of the packet processor 104 use different packet processing instruction tables stored in the packet processing instruction tables memory 105. For example, classification engine 114 may rely on access lists (Ternary Content Addressable Memory, or TCAM, look-up lists) in ACL forwarding tables 115; Layer 3 engine 124 may rely on Longest Prefix Match (LPM) forwarding tables 125; Layer 2 engine 134 may rely on L2 Ethernet MAC Forwarding Database (FDB) tables 135; and Tunneling Engine 144 may rely on Tunnels 145 that Store information for adding a packet header tag (such as a VXLAN header).

Packet processing instruction tables 105 are stored in memory blocks or banks that are provided in network device 100 for that purpose. As noted above, in known implementations, the allocations of various memory blocks or banks are set in advance according to user-selected profiles.

Figure 2:
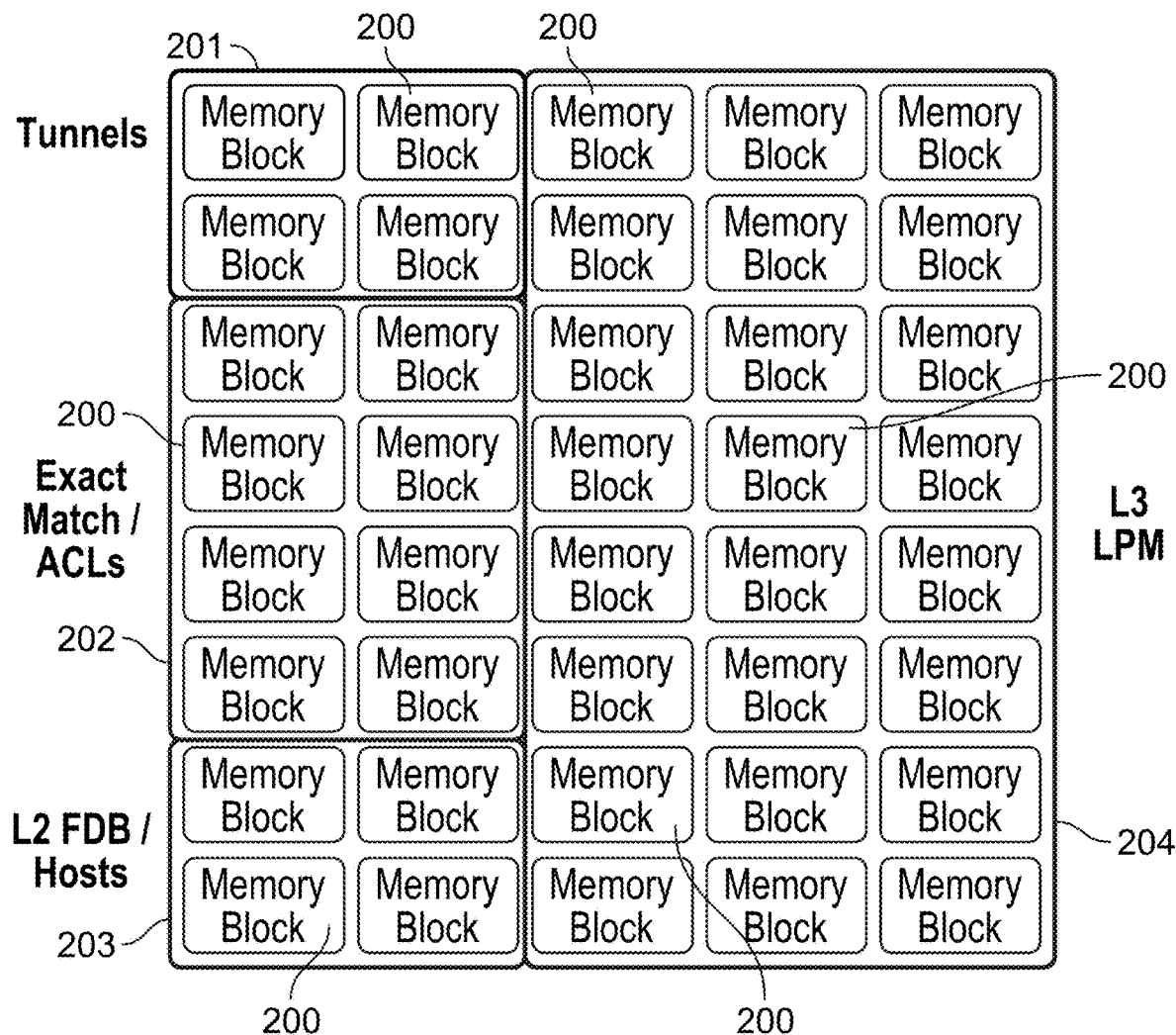
FIG. 2 is a first example of allocation of memory blocks or banks for packet processing instruction tables in a network device.

FIG. 2 shows a first fixed partitioning example in which forty memory blocks or banks 200 are provided for storing the packet processing instruction tables 105. In this example, four of the memory blocks or banks 200 are allocated for Tunnels 201, eight of the memory blocks or banks 200 are allocated for ACLs 202, four of the memory blocks or banks 200 are allocated for Layer-2 FDB forwarding tables 203, and twenty-four of the memory blocks or banks 200 are allocated for Layer 3 LPM forwarding tables 204.

Figure 3:
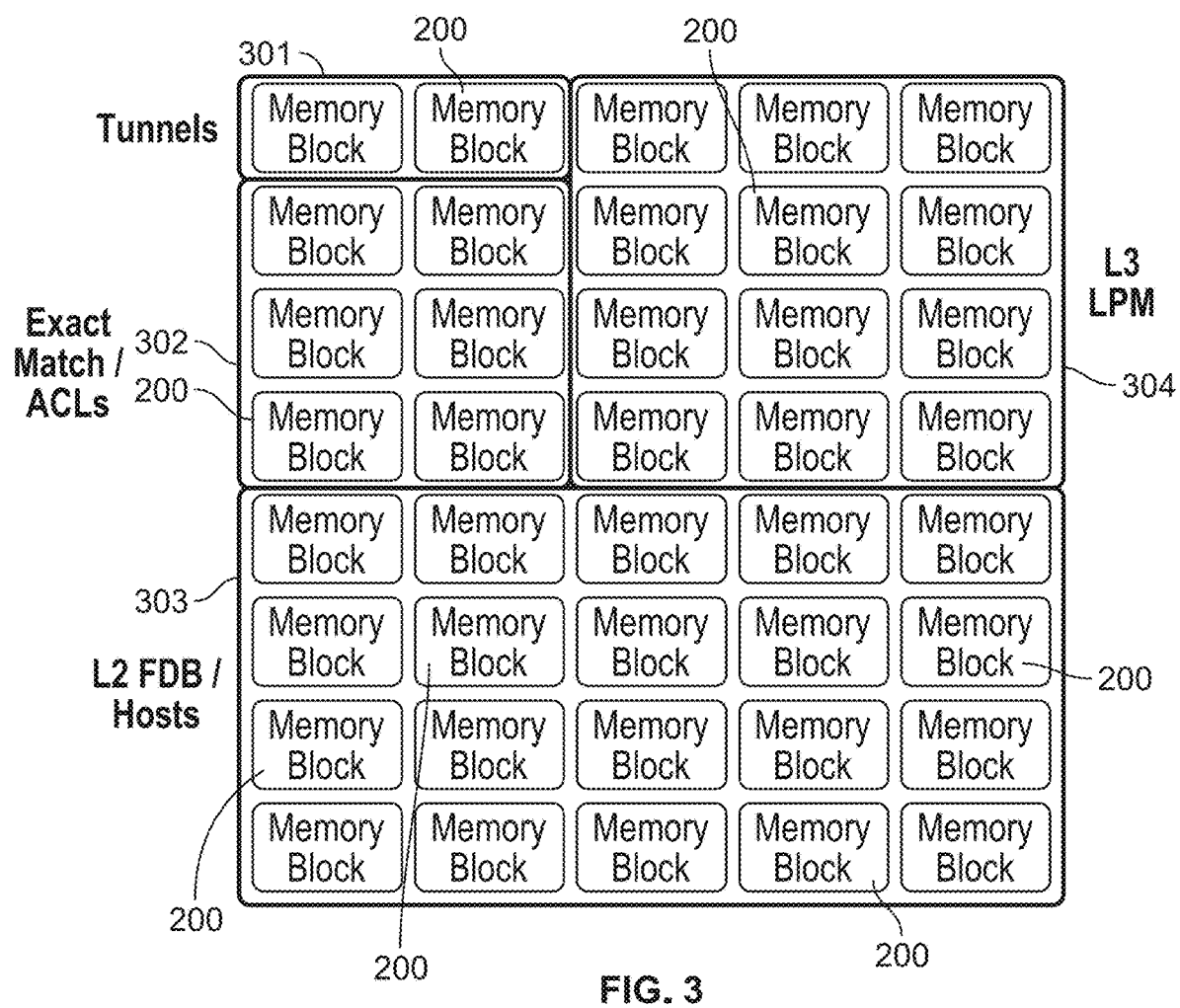
FIG. 3 is a second example of allocation of memory blocks or banks for packet processing instruction tables in a network device.

FIG. 3 shows a second fixed partitioning example in which the same forty memory blocks or banks 200 are provided for storing the packet processing instruction tables 105. In this example, two of the memory blocks or banks 200 are allocated for Tunnels 301, six of the memory blocks or banks 200 are allocated for ACLs 302, twenty of the memory blocks or banks 200 are allocated for Layer-2 FDB forwarding tables 303, and twelve of the memory blocks or banks 200 are allocated for Layer 3 LPM forwarding tables 304.

In both the example of FIG. 2 and the example of FIG. 3, partitioning of a shared memory space is fixed, even though the size requirements of different types of packet processing instruction tables may change over time. Moreover, all memory blocks or banks 200 consume power whether they are used or not. Moreover, as previously noted, if network device 100 were of a previously-known type, then if a change in the allocation of memory blocks or banks 200 were required, network device 100 would have to be stopped.

Figure 4:
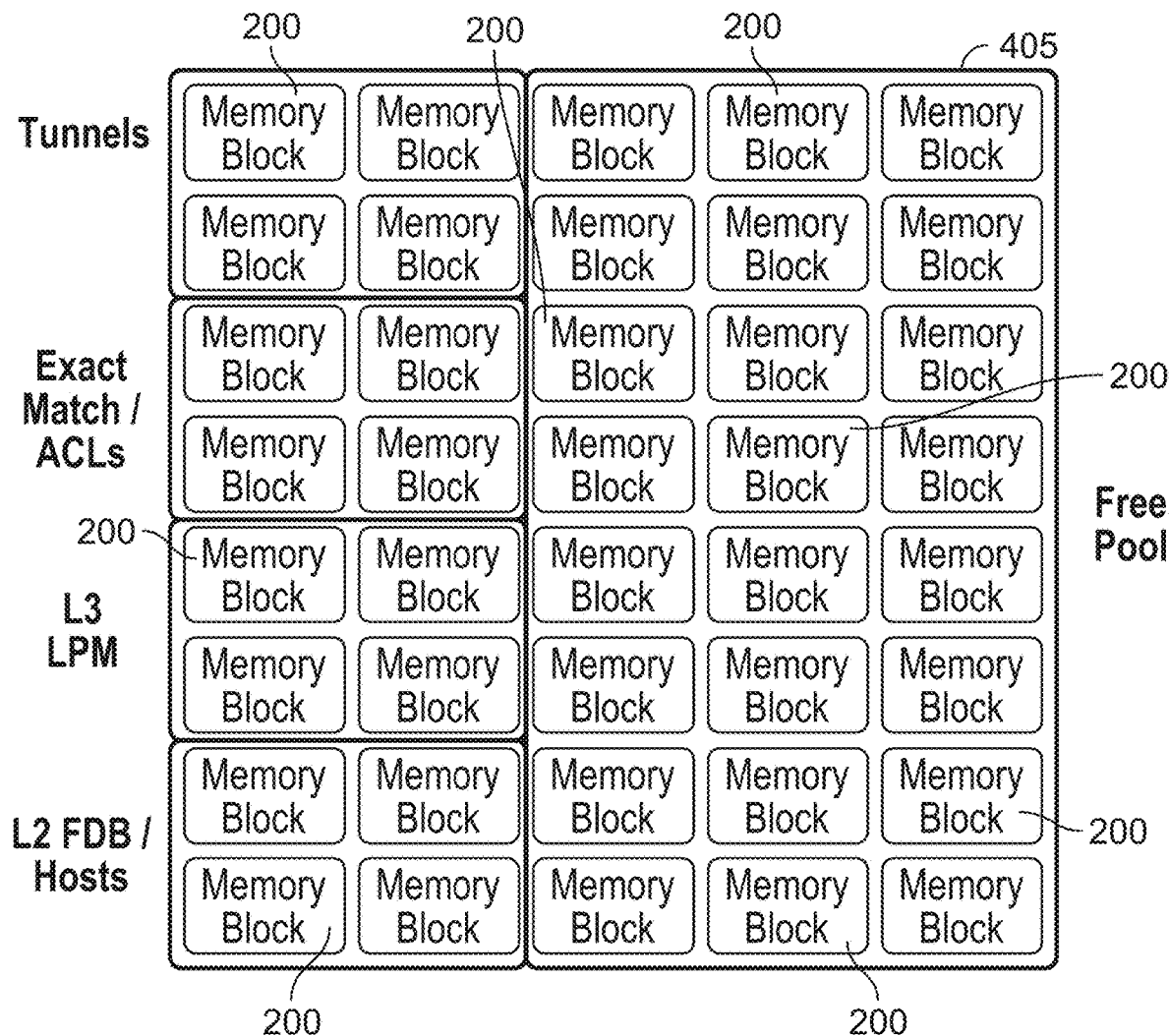
FIG. 4 is an example of allocation of memory blocks or banks for packet processing instruction tables in a network device, in accordance with implementations of the subject matter of the present disclosure.

In accordance with implementations of the subject matter of the present disclosure, partitioning is flexible. As shown in FIG. 4, only as many of memory blocks or banks 200 as are currently needed for the different types 115, 125, 135, 145 of packet processing instruction tables 105 are allocated into groups 401, 402, 403, 404, leaving a pool 405 of free memory blocks or banks 200. If additional memory is needed for one of the types of packet processing instruction tables 105, one or more additional memory blocks or banks 200 are allocated from pool 405 during operation (i.e., "on the fly"). Similarly, if the amount of memory needed for the various types of packet processing instruction tables 105 decreases during use, one or more memory blocks or banks 200 can be deallocated back to pool 405 during operation.

The ability to match the number of allocated ones of memory blocks or banks 200 to actual needs for packet processing instruction tables 105 includes the ability to reallocate blocks from one type of table to another type of table. That ability enables reduction of the size of a shared memory relative to allocating a fixed memory for each type. When the memory space is fixed, conservative margins are provided so that each memory type is sized to accommodate a reasonable worst-case scenario. When the memory is shared, and can be reallocated, the size calculation for the entire memory is different, because one can rely on an assumption that there will not be cases in which a maximum storage requirement is needed concurrently for all of the different types of tables. Instead, when first type of table has a large size requirement, space needed for a second type of table is likely to be smaller, and the space that is not used by that second type of table may be reallocated to store a different type of table. In addition, the ability to reallocate memory blocks or banks reduces power consumption, because only allocated ones of memory blocks or banks 200 need to be powered on.

In order to reduce the size of memory look-up probes, hash functions are used to generate indices into memory blocks or banks 200. A different hash function is associated with each memory block or bank 200. A look-up key is derived from each packet that is processed, based on header information and other characteristics as described above, and the look-up key is run through each hash function, or at least through the hash functions of each memory block or bank 200 that is allocated to the type of packet processing instruction table to be accessed, so that an address is returned for each relevant memory block or bank 200. Each packet processing instruction in each memory block or bank 200 is stored with a copy of the look-up key that would invoke such instruction. For the address returned by each relevant memory block or bank 200, the look-up key stored at that address is compared to the look-up key derived from the packet being processed (i.e., the original look-up key that was hashed to generate the address), and if the stored look-up key matches the original look-up key, the instruction that also is stored at that address is used. As described in more detail below, in some cases, there may be two addresses returned from the hashing of the look-up key that contain matching stored look-up keys. In such case, the instructions at both addresses will be the same and therefore it is acceptable to use either one.

Figure 5:
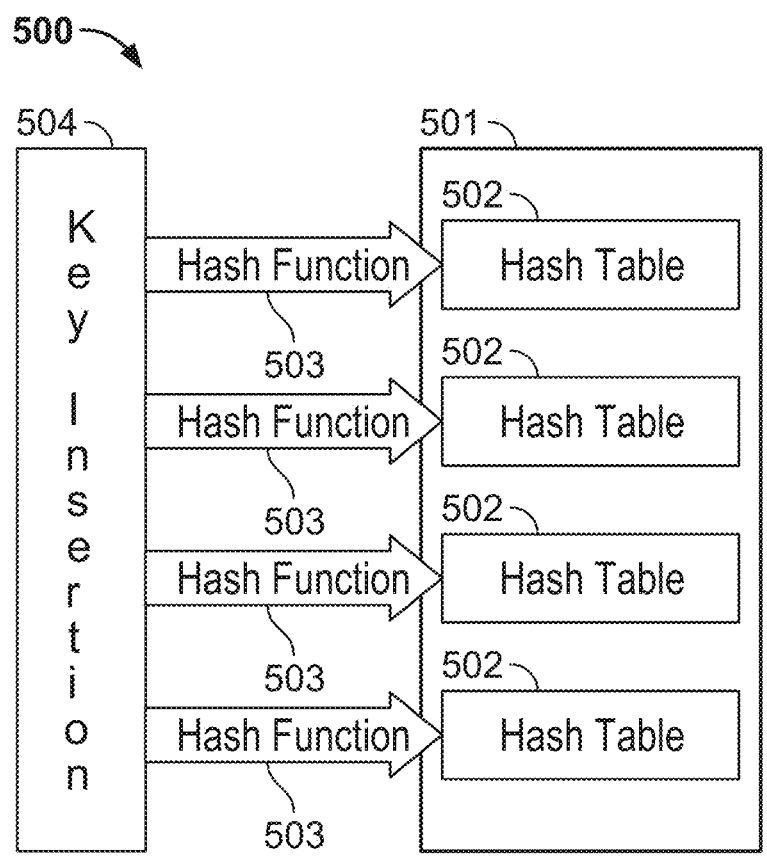
FIG. 5 is a block diagram of an example of a key insertion structure that may be used in a network device according to implementations of the subject matter of the present disclosure.

The tables in memory blocks or banks 200 may be populated under the direction of controller 102 at 112 using any suitable technique. For example, one known technique uses a key insertion structure 500 such as that shown in FIG. 5. Packet processing instruction table 105 may be thought of as a multi-hash table 501 that includes or is subdivided into a plurality of hash tables 502 (each corresponding to a memory block or bank 200), with each of the hash tables 502 accessed by a corresponding hash function 503, which may be implemented in a dedicated hash value generator 122 or by software in controller 102. During configuration or setup, a key insertion unit 504 receives a look-up key and information associated with the look-up key to be inserted into the look-up table 501, applies a respective hash function 503 to the look-up key to generate a respective hashed value for the look-up key, and utilizes the respective hashed values as addresses or indices into the hash tables 502.

If any one of the addressed locations in hash tables 502 is occupied (a "collision"), then in some implementations, that location is not used. In those implementations, key insertion unit 504 stores the key and the associated forwarding instruction in any of the locations for which there is no collision. In other implementations, such as those that rely on cuckoo hashing as described in above-incorporated U.S. Pat. No. 9,171,030, the number of attempts to store a key corresponds to the number of locations in the different banks. Because of techniques such as cuckoo hashing, there may be several iterative attempts to store a value in a particular bank.

Once it has been determined that a key cannot be stored, either because all of the locations are occupied, or because an occupancy threshold that results in a high probability of collisions is exceeded, controller 102 will allocate an additional memory block or bank 200 with a new associated hash function 503, without stopping operation of network device 101. Controller 102 will use key insertion unit 504 to insert the look-up key and the associated instruction in the newly-allocated memory block or bank 200.

During operation, when a packet is being processed, key generator 106 derives a look-up key 116 including packet data from packet header 121. Hash value generator 107 (there may be a separate hash value generator for each of classification engine 114, Layer 3 engine 124, Layer 2 engine 134, and Tunneling Engine 144, based on each engine's respective keys) hashes look-up key 116 using hash functions 503 to generate candidate addresses in the different memory blocks or banks 200 containing packet processing instruction tables 105. The contents of each candidate address are examined and an instruction or action is stored at the address that also contains the look-up key.

Figure 6:
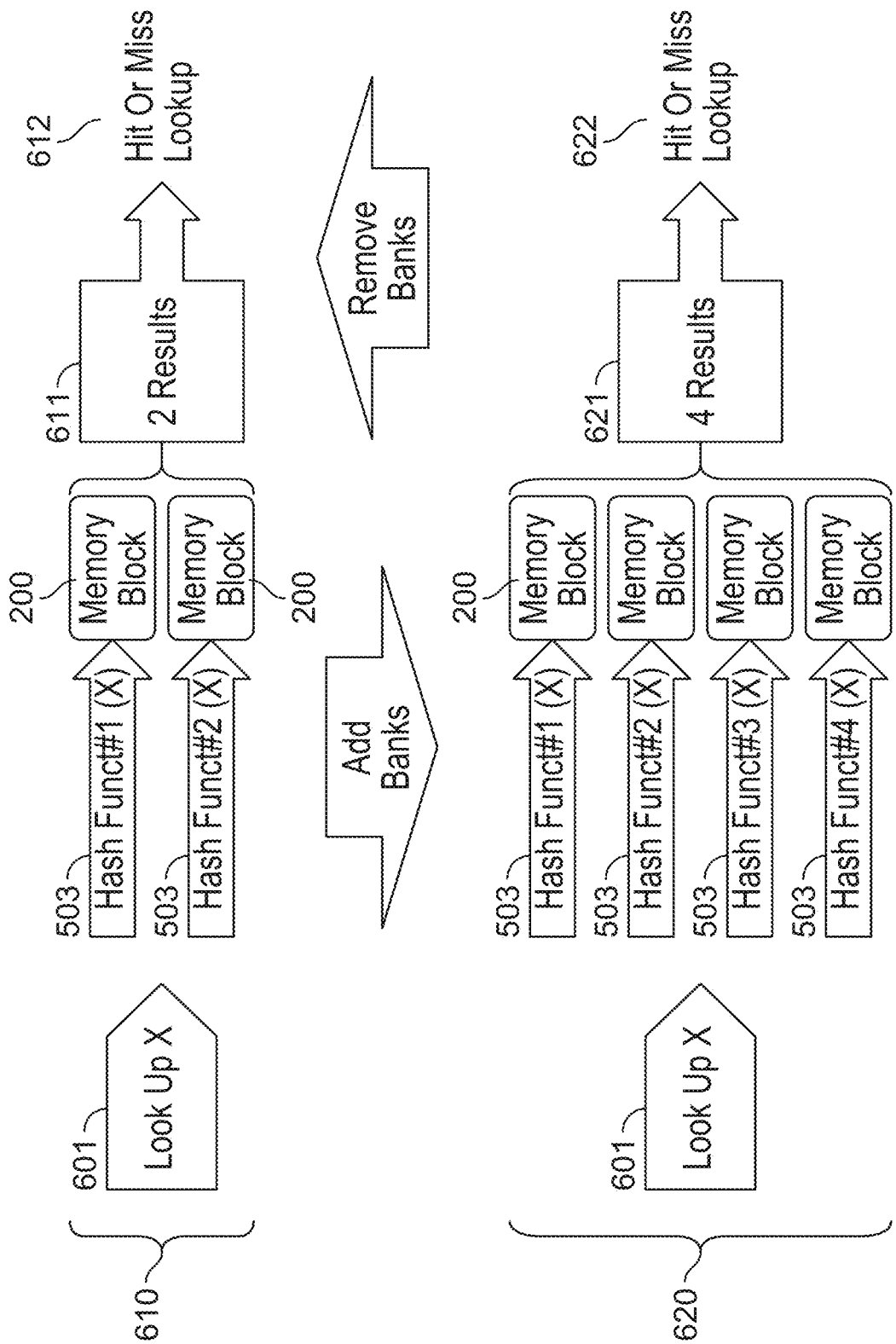
FIG. 6 is a representation of a hash address process that may be used in implementations of the subject matter of the present disclosure.

FIG. 6 shows the foregoing hash address process in cases of two memory blocks or banks 200 and four memory blocks or banks 200. As previously described, look-up key X (601) is run through hash functions 503 to generate addresses or indices into memory blocks or banks 200. In the case 610 of two blocks or banks 200, two results 611 are returned, and hit-or-miss logic 612 examines the two results to select the one containing a copy of look-up key X (601). In the case 620 of four blocks or banks 200, four results 621 are returned, and hit-or-miss logic 622 examines the four results to select the one containing a copy of look-up key X (601).

Figure 7:
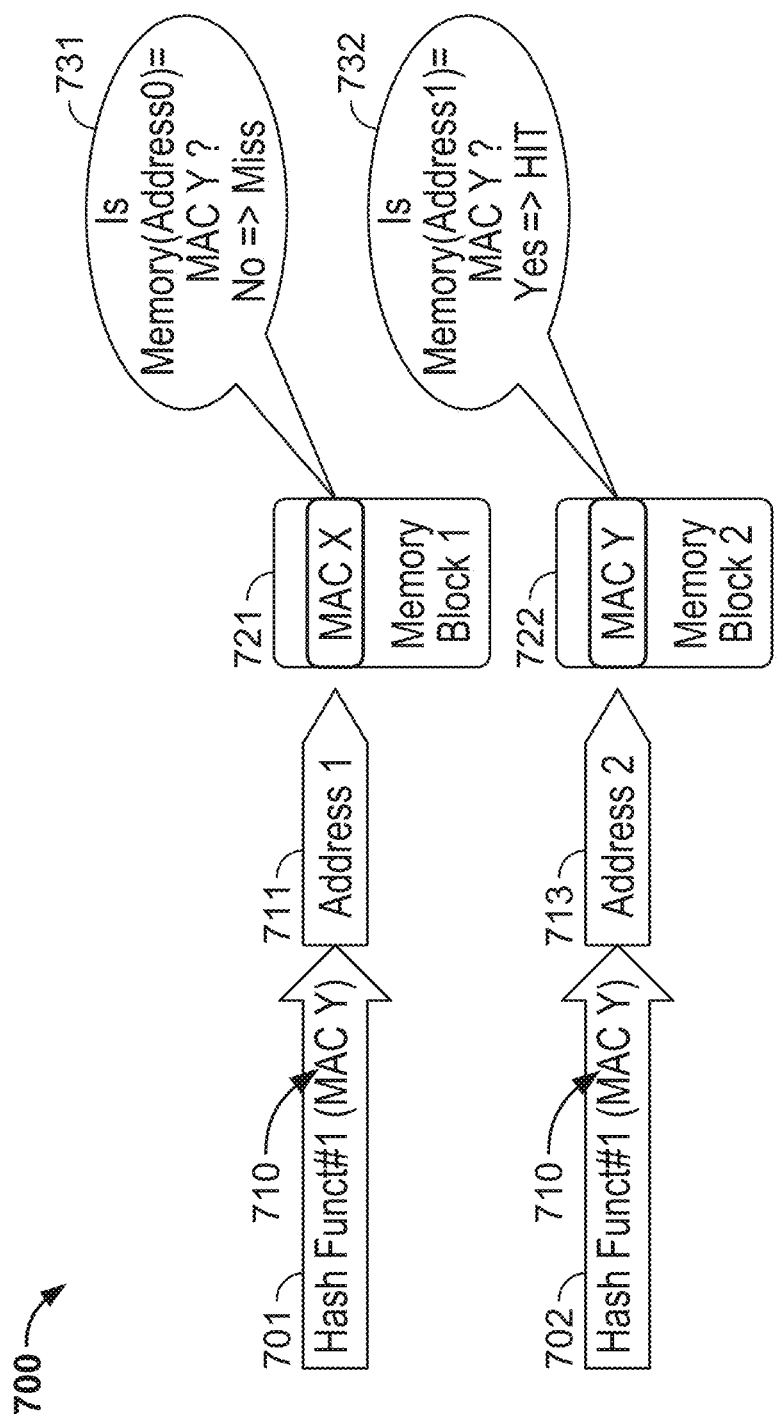
FIG. 7 is an example of hit-or-miss logic in the process of FIG. 6.

Hit-or-miss logic 612 and hit-or-miss logic 622 are essentially the same, and an example 700 of hit-or-miss logic 612 is shown in FIG. 7. The look-up key 710 is "MAC Y". The value "MAC Y" is run through both hash function 701 and hash function 702, generating Address1 (711) and Address2 (712), respectively. Address1 (711) is used as an index into Memory Block 1 (721), and Address2 (712) is used as an index into Memory Block 2 (722). Address1 (711) returns the value "MAC X", while Address2 (712) returns the value "MAC Y". Therefore, at 731, hit-or-miss logic 700 determines that Address1 (711) has yielded a miss, while at 732, hit-or-miss logic 700 determines that Address2 (712) has yielded a hit.

As discussed above, and as shown in FIG. 6, implementations of the subject matter of this disclosure can be used to both increase and decrease the number of memory blocks or banks 200 during operation of network device 101, either to reflect occupancy levels in the various memory blocks or banks 200, or to allow reallocation of memory blocks or banks 200 from one type of table to another. As discussed, the number of memory blocks or banks 200 may be increased by simply turning on additional memory blocks or banks 200, and adding a hash function for the newly turned-on block or bank 200.

Deallocating memory blocks or banks 200 is more complicated. First a decision may be made to decrease the number of memory blocks of banks 200 that are in use. Such a decision may be made to reduce power consumption, as discussed, based on time of day, based on monitoring of capacity revealing that capacity of the memory blocks or banks 200 that are in use has fallen below some threshold (e.g., to the point that the empty space in memory blocks or banks 200 that are in use exceeds the amount of space in one memory block or bank 200 by a predetermined margin, or some combination of time of day and capacity. Alternatively, a memory block or bank 200 may be deallocated from one or some, but not all of the packet processing instruction tables, to allow for use of that memory block or bank 200 by one or more others of the packet processing instruction tables.

Once a decision has been made to deallocate one or more memory blocks or banks 200, all of the packet processing instructions and associated look-up keys related to whichever table or tables as to which a memory block or bank 200 is being deallocated must be copied into empty locations in other memory blocks or banks 200 that are to remain allocated to that table or tables. If a memory block or bank 200 is to be deactivated altogether to save power, then all of the packet processing instructions and associated look-up keys stored in the memory block or bank 200 must be copied to other locations. Either way, new locations for the packet processing instructions and associated look-up keys that are being moved may be determined by re-hashing the affected look-up keys through a key insertion structure such as the key insertion structure of FIG. 5 to find empty locations in the memory blocks or banks 200 that are to remain in operation.

In order for network device 101 to remain in operation while the number of memory block or banks 200 in packet processing instruction tables 105 is being decreased, the packet processing instructions (and their keys) that are being moved must remain in their original locations until the re-hashing process is completed (either for any individual key/instruction combination or for all key/instruction combinations, according to the particular implementation). That means that there may be a time when a look-up key for a packet to be processed, when hashed, will return more than one (generally only two) valid key/instruction locations—one containing the look-up key and its associated packet processing instruction in its original memory block or bank 200 that is being deactivated, and one containing the look-up key and its associated packet processing instruction in its new memory block or bank 200. As noted above, either one can be used, insofar as they are identical.

Figure 8:
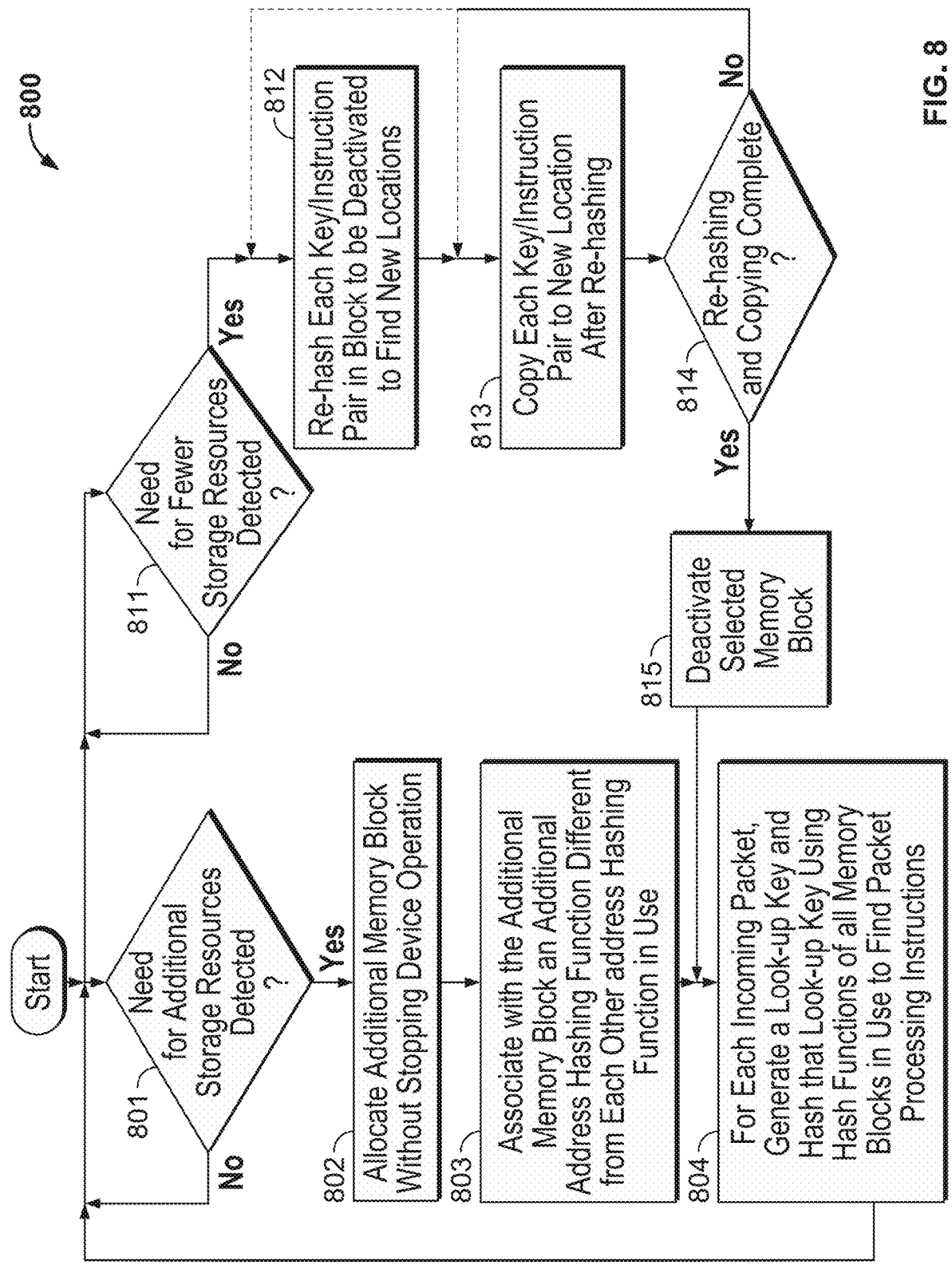
FIG. 8 is a flow diagram of a process of operating a network device according to implementations of the subject matter of the present disclosure.

FIG. 8 depicts a flow diagram of a process 800 in accordance with implementations of the subject matter of the present disclosure for increasing the number of memory blocks or banks 200 in packet processing instruction tables 105. Process 800 begins at 801 where the system waits until it is determined that additional storage resources are needed for the packet processing instruction tables. As noted above, such a determination may result from an inability to store packet processing instructions without collisions after some predetermined number of attempts, or on an occupancy level exceeding a predetermined threshold selected to keep the probability of collisions at an acceptable level.

Once it is determined that additional storage resources are needed, then at 802 an additional memory block or bank is allocated for the packet processing instruction tables, without interrupting the operation of network device 100. At 803, an additional address hashing function, different from each of the other address hashing functions in use for other memory blocks or banks, is associated with the newly-allocated additional memory block or bank. The system continues with normal packet processing operations at 804 (which will have been ongoing during the process as described up through 803), where, as described above, for each incoming packet, a look-up key is generated and hashed using the hashing functions of all memory blocks or banks that are in use to find the appropriate packet processing instructions. Flow then returns to the beginning of process 800 to wait until there is a need for further additional resources (or until a need for fewer resources is detected).

In parallel with 801-803, at 811 the system waits until it is determined that there is a need for fewer resources are needed for the packet processing instruction tables. As noted above, such a determination may result from a preset schedule according to which, at certain times of day (e.g., late nights), the number of memory blocks or banks allocated to the packet processing instruction tables is reduced because data traffic is lighter, or may result from detecting that the occupancy of the currently-allocated memory blocks or banks has fallen below a predetermined threshold, or a memory block or bank may be needed for a different type of packet processing instruction table.

Once it is determined that a memory block or bank is to be deactivated, then at 812, each key/instruction pair in the memory block or bank to be deactivated is re-hashed using the hashing functions of the remaining memory blocks or banks, to find a new location among the remaining memory blocks or banks for each key/instruction pair. At 813, each key/instruction pair is copied to the new location determined by the re-hashing.

At 814, it is determined whether or not re-hashing and copying of the contents of the memory block or bank to be deactivated has been completed. If not, then flow returns to 812 and/or 813 as necessary, to complete the re-hashing and copying. If, at 814, it is determined that re-hashing and copying of the contents of the memory block or bank to be deactivated has been completed, then at 815, that memory block or bank is deactivated, and the system continues with normal packet processing operations at 804 (which will have been ongoing during the process as described up through 815) as above.

Although not shown in FIG. 8, which diagrams only a method for allocating a new memory block or bank 200, after a new memory block or bank 200 has been allocated, controller 102 begins populating the new memory block or bank 200 with new packet processing instruction entries.

Thus it is seen that a network device in which memory blocks or banks for packet processing instruction tables are allocated and de-allocated without interrupting device operation, and a corresponding method of operation, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for operating a network device having a data storage resource for storing data for network transmissions, the method comprising:
   maintaining a plurality of allocated memory blocks, each respective allocated memory block being associated with a respective address hashing function, each respective address hashing function transforming a look-up key into a respective addressable location in a respective one of the at least one respective allocated memory block;
   maintaining a reserve of at least one additional memory block;
   determining that any one of the respective allocated memory blocks is an excess memory block that is not required for operation of the network device; and
   deallocating the excess memory block without interrupting searching operations being performed in the one of the respective allocated memory blocks of the data storage resource, by:
   storing a copy of data from the excess memory block in one of the at least one remaining one of the at least one respective allocated memory block;
   rehashing the copy of the data from the excess memory block, stored in the one of the at least one remaining one of the at least one respective allocated memory block, according to a respective address hash function of the at least one remaining one of the at least one respective allocated memory block, to form a new addressable location in the respective one of the at least one respective allocated memory block for the copy of the data from the excess memory block, for continued availability for network transmissions, by transformation of a look-up key into the new addressable location, of the data from the excess memory block.

2. The method of claim 1 wherein the deallocating further comprises:
   concurrently searching in the excess memory block and the at least one remaining one of the at least one respective allocated memory block until all stored data in the excess memory block has been copied to the at least one remaining one of the at least one respective allocated memory block; and
   after all stored data in the excess memory block has been copied to the at least one remaining one of the at least one respective allocated memory block, returning the excess memory block to the reserve.

3. The method of claim 2 further comprising:
   when the concurrently searching in the excess memory block and the at least one remaining one of the at least one respective allocated memory block, according to a respective addressable location associated with results of one of the respective hash functions, results in retrieving a first instance of the particular data from the excess memory block and a second instance of the particular data from a remaining one of the at least one respective allocated memory block, selecting one of the first instance of the particular data and the second instance of the particular data.

4. The method of claim 1 further comprising:
   monitoring capacity of the one of the at least one respective allocated memory block; wherein:
   the determining comprises detecting that the occupancy of the one of the at least one respective allocated memory block has fallen below a predetermined threshold.

5. The method of claim 1, further comprising:
   detecting a need for additional storage resources to store data for network transmissions;
   allocating an additional memory block from the reserve, to store the data for network transmissions, without interrupting operation of the data storage resource;
   associating with the additional memory block an additional address hashing function, different from each of at least one respective previous address hashing function associated with a respective one of the at least one respective allocated memory block, each respective previous address hashing function transforming a look-up key into a respective addressable location in a respective one of the at least one respective allocated memory block, and the additional address hashing function transforming the look-up key into an addressable location in the additional memory block;

storing a unit of data for network transmissions in the additional memory block; and processing the unit of data, stored in the additional memory block, through the additional address hashing function to determine an addressable location, in the additional memory block, of the unit of data.

6. The method of claim 5, further comprising:

receiving a request for particular data and generating from the request an incoming look-up key for the particular data;

processing the incoming look-up key through each of the at least one respective previous address hashing function to generate respective hash results, and through the additional address hashing function to generate an additional hash result; and accessing each respective allocated memory block according to a respective memory address associated with one of the respective hash results and accessing the additional memory block according to an additional memory address associated with the additional hash result, to retrieve the particular data.

7. The method of claim 6 wherein the accessing each respective allocated memory block according to a respective memory address associated with one of the respective hash results, and the accessing the additional memory block according to an additional memory address associated with the additional hash result, are performed concurrently, together returning a plurality of candidate units of data; the method further comprising:

selecting one of the candidate units of data as the particular data.

8. The method of claim 7 wherein:

each unit of the data for the type of packet processing operation stored at a location in one of the additional memory block and the at least one respective allocated memory block is stored along with a raw look-up key that was hashed to determine the location to store the unit of the data for the type of packet processing operation; and the selecting comprises comparing the raw look-up key to the incoming look-up key.

9. The method of claim 5, wherein the detecting the need for additional storage resources to store data for network transmissions comprises:

attempting to store a unit of the data for network transmissions; and finding only occupied memory locations during the attempting.

10. The method of claim 1, wherein maintaining a plurality of allocated memory blocks comprises maintaining at least one respective allocated memory block for each of at least two respective types of data comprises associating each respective allocated memory block with an attribute of the respective type of data stored in the respective allocated memory block.

11. The method of claim 10, wherein the maintaining at least one respective allocated memory block for each of at least two respective types of data comprises associating each respective allocated memory block with a physical attribute of the respective type of data stored in the respective allocated memory block.

12. The method of claim 10 wherein the maintaining at least one respective allocated memory block for each of at least two respective types of data comprises associating each respective allocated memory block with an attribute of the respective type of data stored in the respective allocated memory block comprises associating each respective allocated memory block with a source of the respective type of data stored in the respective allocated memory block.

13. A network device, comprising:

at least one respective quantity of allocated memory blocks for storing data for network transmissions, each respective allocated memory block being associated with a respective address hashing function, each respective address hashing function transforming a look-up key into a respective addressable location in a respective one of the at least one respective allocated memory block;

a reserve of at least one additional memory block; and a controller configured to selectably modify the respective quantity of memory blocks for one of the respective types of data, by:

determining that any one of the respective allocated memory blocks is an excess memory block that is not required for operation of the data storage resource, and deallocating the excess memory block without interrupting searching operations being performed in the one of the respective allocated memory blocks of the data storage resource, by:

storing a copy of data from the excess memory block in one of the at least one remaining one of the at least one respective allocated memory block;

rehashing the copy of the data from the excess memory block, stored in the one of the at least one remaining one of the at least one respective allocated memory block, according to a respective address hash function of the at least one remaining one of the at least one respective allocated memory block, to form a new addressable location in the respective one of the at least one respective allocated memory block for the copy of the data from the excess memory block, for continued availability for network transmissions, by transformation of a look-up key into the new addressable location, of the data from the excess memory block.

14. The network device of claim 13 wherein the controller is further configured to:

concurrently search in the excess memory block and the at least one remaining one of the at least one respective allocated memory block until all stored data in the excess memory block has been copied to the at least one remaining one of the at least one respective allocated memory block; and after all stored data in the excess memory block has been moved to the at least one remaining one of the at least one respective allocated memory block, return the excess memory block to the reserve.

15. The network device of claim 14 wherein the controller is further configured to, during the concurrent searching in the excess memory block and the at least one remaining one of the at least one respective allocated memory block, when accessing each respective allocated memory block, according to a respective memory address associated with results of one of the respective hash functions, results in retrieving a first instance of the particular data from the excess memory block and a second instance of the particular data from the respective remaining memory block:

select one of the first instance of the particular data and the second instance of the particular data.

16. The network device of claim 13 wherein the controller is further configured to:

monitor capacity of the respective allocated memory blocks and the additional memory block; and determine that any one of the respective allocated memory blocks is an excess memory block that is not required for operation of the data storage resource by detecting that the capacity of the respective allocated memory blocks and the additional memory block has fallen below a predetermined threshold.

17. The network device of claim 13 wherein the controller is further configured to:

detect a need for additional storage resources to store the one of the respective types of data;

allocate an additional memory block, to store the one of the respective types of data, without interrupting operation of the data storage resource;

associate with the additional memory block an additional address hashing function, different from each of at least one respective previous address hashing function associated with at least one of the at least one respective quantity of allocated memory blocks, each respective previous address hashing function transforming a look-up key into a respective addressable location in a respective one of the at least one quantity of allocated memory blocks, and the additional address hashing function transforming the look-up key into an addressable location in the additional memory block;

store the unit of the one of the respective types of data at the location determined by the additional address hashing function, and process a unit of the one of the respective types of data through the additional address hashing function to determine an addressable location, in the additional memory block, of the unit of data.

18. The network device of claim 17, wherein the controller is further configured to:

receive a request for particular data and generate from the request an incoming look-up key for the particular data;

process the incoming look-up key through each of the at least one respective previous address hashing function to generate respective hash results, and through the additional address hashing function to generate an additional hash result; and access each respective allocated memory block according to a respective memory address associated with one of the respective hash results, and access the additional memory block according to an additional memory address associated with the additional hash result, to retrieve the particular data.

19. The network device of claim 18 wherein the controller is configured to:

concurrently access each respective allocated memory block according to a respective memory address associated with one of the respective hash results, and the additional memory block according to an additional memory address associated with the additional hash result, to return a plurality of candidate units of the particular data; and select one of the candidate units of the particular data.

20. The data storage resource of claim 19 wherein:

each unit of the particular data stored at a location in one of the additional memory block and the at least one respective allocated memory block is stored along with a raw look-up key that was hashed to determine the location to store the unit of the particular data; and the controller is configured to select one of the candidate units of the particular data by comparing the raw look-up key to the incoming look-up key.

* * * * *